United States Patent [19]

Aitcin et al.

[11] 4,384,896

[45] May 24, 1983

[54] AGGLOMERATED VOLATILIZED SILICA DUST

[75] Inventors: Pierre C. Aitcin; Philippe Pinsonneault; Roland Fortin, all of Sherbrooke, Canada

[73] Assignee: Universite' de Sherbrooke, Quebec, Canada

[21] Appl. No.: 335,847

[22] Filed: Dec. 30, 1981

[30] Foreign Application Priority Data

Jun. 8, 1981 [CA] Canada ................................. 379310

[51] Int. Cl.$^3$ ............................................. C09C 1/28
[52] U.S. Cl. ................................... 106/238 B; 106/98
[58] Field of Search ............... 501/133, 122, 123, 154; 106/98, 288 B

[56] References Cited

U.S. PATENT DOCUMENTS

| | | | |
|---|---|---|---|
| 3,192,060 | 6/1965 | Tilsen | 106/98 |
| 3,788,866 | 1/1974 | Flood et al. | 501/123 |
| 4,105,463 | 8/1978 | Angelbeck | 423/337 |
| 4,118,450 | 10/1978 | Nakamura et al. | 501/154 |

Primary Examiner—James Poer
Attorney, Agent, or Firm—Cushman, Darby & Cushman

[57] ABSTRACT

There is provided a process for agglomerating volatilized silica in the form of grains by wetting same with from about 10 to about 35% by weight of an alkali or alkaline earth metal oxide solution in water, said agglomerated volatilized silica having a densification factor of 1.7 to 2.5 (when oven-dried) and a dry bulk density of from about 500 to 775 kg/m$^3$. These agglomerated volatilized silica grains can be used to replace advantageously up to 50%, and in some cases more, by weight of Portland cement in the manufacture of concrete.

5 Claims, No Drawings

AGGLOMERATED VOLATILIZED SILICA DUST

The present invention relates to the preparation of silica fume or volatilized silica by agglommerating it in the form of coarse grains capable of disintegrating when incorporated in a concrete mixer during the manufacture of concrete.

BACKGROUND OF THE INVENTION

Silicon and ferrosilicon are obtained by subjecting quartz, when silicon is desired, or quartz and an iron bearing material, when ferrosilicon is desired, to a reduction with coke or coal and woodchips in an open electric arc furnace. The quartz and coke or coal used must be as pure as possible in order to obtain the purest silicon or ferrosilicon possible.

Quartz is one of the crystalline form of silicon dioxide and its reduction with carbon does not follow the reaction:

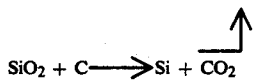

In fact, there is an intermediate reaction which takes place wherein a suboxide of silicon is formed according to the reaction:

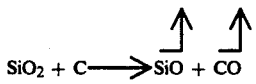

Part of the gaseous suboxide of silicon which is formed escapes with the CO gas and will then react with the oxygen in the air in accordance with the reaction:

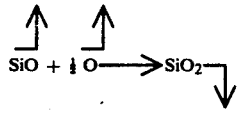

The gases which escape from the furnace will contain minor amounts of other metallic gases which are mainly very volatile. Alkali metals, such as potassium and sodium, condense at the same time as the suboxide of silicon to form glassy microscopic particles. These glassy microscopic particles are known as silica fumes, volatilized silica or submicron silica. These particles are collected through various filtering systems. The amount of silica fumes or volatilized silica represents about 250 to 500 kilograms per ton of metal produced. The expression 'volatilized silica', whenever used herein, is intended to cover the very fine silica particles which are usually referred to either as volatilized silica, silica fumes or silica dust and also volatilized ferrosilicon, ferrosilicon fumes or ferrosilicon dust.

Further, volatilized silica is characterized by having a very fine particle size. The average diameter of the glassy microscopic particles varies from 0.5 to 1.0 $\mu$m, this diameter being from 50 to 100 times smaller than that of Portland cement or fly ash. Also, because of its microscopic size, the specific surface of volatilized silica can be as high as 20,000 m$^2$/kg, which is at least 50 times greater than that of Portland cement or fly ash.

The chemical composition of volatilized silica will vary slightly whether it is obtained from the manufacture of silicon or ferrosilicon, and generally the silicon dioxide content will vary from 85% to 95%, the carbon content will be from 2 to 5% while the content of aluminum oxide and calcium oxide will generally be less than 2%.

Furthermore, the chemical composition of volatilized silica is quite different than that of pozzolan and fly ash. The volatilized silica has a SiO$_2$ content much higher than that of pozzolan and fly ash while the aluminum oxide content of the latter two compounds is substantially greater than that of the volatilized silica dust.

A further distinction between volatilized silica, natural pozzolan and fly ash is that the ASTM standard C 618-78 requires that when substituting 30% of Portland cement with fly ash or pozzolan in a standard mortar, the amount of water to be added must not be increased by more than 15%. When attempting to substitute 30% of Portland cement with volatilized silica, it has been found that 50% water must be added to get a mortar of normal consistency.

Furthermore, it is known that the incorporation of fly ash or pozzolan to concrete requires a few months before an increase in compression strength is noted while in less than one month, a slight decrease of its resistance is observed. When silica fumes are used in concrete, high increases are observed after one week.

The disposal of such large volumes of volatilized silica represents a problem because of the physicochemical properties of volatilized silica. Volatilized silica is very light in weight since its bulk density is from 200 to 250 kg/m$^3$, which means that 1 kg of volatilized silica occupies a volume which is 4 to 5 times greater than 1 kg of Portland cement or fly ash, two other powders more or less similarly used in concrete.

It will be appreciated that the disposal of large quantities of volatilized silica causes an environmental problem. Accordingly, for most producers of silicon or ferrosilicon, the large volumes of the volatilized silica produced, creates a disposal problem and so far most companies are content to bury the volatilized silica by-product. Nevertheless, this is not an answer to the problem because now environmentalists are taking note of this type of disposal and in certain countries recent legislation has been set up to control or prevent this type of disposal.

It is known that a small amount of volatilized silica could be used in certain countries to replace a small amount of Portland cement in the manufacture of concrete. In this case generally the volatilized silica is sold in the form of a dilute slurry. This operation can be done when the silicon manufacturing plant is within a short distance of the concrete mixing plant and where the climatic condition of the country is such that transporting an aqueous slurry of volatilized silica will not cause any problem in the winter months. This mode of delivery has been chosen because of its lightness and particle size, volatilized silica cannot be transported over any reasonable distance in any kind of tightly closed container nor can it be economically packaged. It is well known that every time the volatilized silica is manipulated in a dry form it creates uncontrollable dust problems so that the user must have a sophisticated and very expensive dust collector system.

Accordingly, it would appear highly desirable if a procedure for disposing of volatilized silica could be developed which would offer various possibilities depending upon the seasonal needs of various types of industries.

SUMMARY OF THE INVENTION

In accordance with the present invention, there is now provided a process for treating volatilized silica whereby said volatilized silica can be easily manipulated, stored and transported in any kind of climatic conditions. Furthermore, it has been found that treatment of volatilized silica in accordance with the present invention can provide a product which is suitable for replacing a portion of the Portland cement used in the manufacture of concrete. The product produced in accordance with the present invention possess the advantage of being easily packaged, stored and transported.

DETAILED DESCRIPTION OF THE INVENTION

The problem of agglomerating of volatilized silica has been solved by providing a coarser powder.

It is known that the volatilized silica is difficult to wet with water even in the presence of wetting or dispersing agent and that when up to 40% of water is added to a certain amount of volatilized silica a black elastic paste is suddenly obtained. This change in the behaviour of the volatilized silica is very sensitive to a change of ± 2% in its water content.

It has now been found in accordance with the present invention, that these drawbacks can be overcome by mixing a solution of an alkali or alkaline earth metal oxide solution with volatilized silica particles and after thorough mixing, recovering the volatilized silica in the form of grains or sand-like grains having a particle size of from about 80 micrometers to about 1.25 mm and a water content of less than 35%.

The alkali of alkaline earth metal oxide which are preferably used are calcium oxide, sodium oxide or potassium oxide. The selection of a particular metal oxide will be made on the basis of the intended use of the agglomerated volatilized silica grains. For example, if the volatilized silica grains are intended to be incorporated in concrete, only the calcium oxide will be used, while if the agglomerated volatilized silica grains are intended to be used in ceramic products, the sodium, potassium or magnesium oxides could be used.

When an alkaline earth metal oxide such as calcium oxide is used, it is used as a supersaturated solution, for example 12 g of hydrated lime in 2 liters of water per 10 kg of volatilized silica to be agglomerated. On the other hand, when an alkali oxide solution is to be used about 9.5 g of potassium oxide in 1.5 liters of water or about 12 g of sodium oxide in 2 liters of water per 10 kg of volatilized silica to be agglomerated.

The mixing of the solution of alkali or alkaline earth metal oxide with the volatilized silica is carried out in any standard mixer equipped with a mixing blade. As far as the solution of alkali or alkaline earth metal oxide is concerned it is added to the volatilized silica in the form of a fine spray thus favouring the agglomeration of the silica dust.

More specifically, the mixture procedure can be carried out by mixing the volatilized silica with from about 10 to 35% by weight of an alkali or alkaline earth metal oxide solution in a mixer, with 15 to 20% by weight being preferably used.

This agglomerated volatilized silica can be readily used to replace up to 50% by weight of Portland cement, or in some cases more, when making concrete. For example, the addition of this agglomerated volatilized silica prepared in accordance with the present invention in an amount of 15% by weight of the amount of Portland cement in concrete provides an increase in compressive strength of the concrete of 38% after 7 days and 75% after 28 days.

Another feature of the agglomerated silica grains prepared in accordance with the present invention is that they provide for a densification of the volatilized silica of from 1.7 to about 2.5 (oven-dried). For example, while one cubic meter of volatilized silica weighs from 200 to 250 kg/m$^3$, it has been found that one cubic meter of agglomerated silica grains, prepared in accordance with the present invention, weighs from 475 to 775 kg/m$^3$ which represents a densification factor of from 1.7 to 2.5 (oven-dried conditions).

Another advantage of the agglomerated volatilized silica grains of the present invention is that they do not create any dust problems and their handling is similar to that of Portland cement in that the grains can be bagged or pumped into containers.

The present invention will be more readily understood by referring to the following examples which are given to illustrate the invention only.

EXAMPLE 1

There is introduced 10 kg of volatilized silica in a mixer (for example an Eyrich ® R7 mix-pelletizer) while vaporizing therein the supersaturated lime solution prepared by adding 12 g of hydrated lime in 2.0 liters of water. The volatilized silica particles agglomerate and produce a material looking like a wet sand that can be handled without any dusting problem. The water content of this new powder is 20%. Its dry bulk density is about 690 kg/m$^3$, which represents a densification factor of 2.5 (oven-dried).

EXAMPLE 2

Three concrete mixes were prepared having the ingredients shown in Table I:

TABLE I

| | volatilized silica | | |
|---|---|---|---|
| | none | as produced in dust form | agglomerated according to Example 1 |
| Portland cement (kg/m$^3$) | 265 | 245 | 250 |
| Volatilized silica (kg/m$^3$) | 0 | 40 | 40 |
| Water (kg/m$^3$) | 165 | 190 | 185 |
| Crushed stone (kg/m$^3$) | 1030 | 960 | 960 |
| Sand (kg/m$^3$) | 920 | 860 | 840 |
| Slump (mm) | 60 | 80 | 115 |
| Air content (%) | 5.0 | 6.0 | 5.1 |

The concretes prepared in accordance with the amounts of Table I were tested for compression strength at 3, 7, 14 and 28 days after their preparation and the results are reported in Table II:

TABLE II

| Time in days | Concrete without volatilized silica MPa | Concrete with as produced volatilized silica MPa | Concrete with agglomerated (Example 1) volatilized silica MPa |
| --- | --- | --- | --- |
| 3 | 11.0 | 14.8 | 15.2 |
| 7 | 16.1 | 22.2 | 22.3 |
| 14 | 17.4 | 29.7 | 30.5 |
| 28 | 20.5 | 35.6 | 36.5 |

As can be seen from these results, it is obvious that the addition of agglomerated volatilized silica grains, prepared in accordance with the present invention, substantially increases the compressive strength of concrete in the same manner as untreated volatilized silica, but the grains of the present invention offer the advantage of being readily transported and of being substantially free of dust.

The following Table III sets out the various differences in physical properties and chemical composition between volatilized silica, fly ash and agglomerated volatilized silica.

TABLE III

|  | Volatilized silica | Fly Ash | Agglomerated volatilized silica |
| --- | --- | --- | --- |
| Average diameter in μm | 0.5–1.0 | 30–100 | 300 |
| Surface area m²/kg | 20 000 | 300–500 | — |
| Bulk density in kg/m³ | 200–250 | 350–850 | 500–775 |
| % SiO$_2$ | 85–95 | 20–70 | 85–95 |
| % Carbon content | 2–5 | up to 12% | 2–5 |
| % Al$_2$O$_3$ + CaO | <2% | 10–50 | <2% |

EXAMPLE 3

By proceeding in the manner described in Example 1 and substituting for the supersaturated lime solution a solution of 9 g of potassium oxide in 1.5 liters of water, grains similar to those of Example 1 are obtained. The grains have a water content of 15%, a bulk density of 480 kg/m³ which represents a densification factor of 1.7 (oven-dried).

EXAMPLE 4

By proceeding in the manner described in Example 1 and substituting for the supersaturated lime solution a solution of 12 g of sodium oxide in 2.0 liters of water, grains similar to those of Example 1 are obtained. These grains have a water content of 20%, a bulk density of 600 kg/m³ which represents a densification factor of 2.1 (oven-dried).

We claim:

1. Agglomerated volatilized silica grains consisting essentially of agglomerated volatilized silica fumes bound by an alkali or alkaline earth metal oxide in an amount of less than 0.12% by weight, said grains having a particle size of between about 80 micrometers to about 1.25 mm, a water content of less than about 35%, said grains having a bulk density of from about 450 to about 775 kg/m³ corresponding to a densification factor of from 1.7 to 2.5 when oven-dried.

2. Agglomerated volatilized silica grains consisting essentially of agglomerated volatilized silica fumes bound by calcium oxide in an amount of less than 0.12% by weight, said grains having a particle size of between about 80 micrometers to about 1.25 mm, a water content of less than about 20% by weight, said grains having a bulk density of from about 450 to about 775 kg/m³ corresponding to a densification factor of from 1.7 to 2.5 when oven-dried.

3. A process for agglomerating volatilized silica in the form of fine sand-like grains, which consisting essentially of mixing volatilized silica fumes with 10 to 35% by weight of a solution of an alkali oxide and recovering sand-like grains of volatilized silica having a particle size of from about 80 micrometers to about 1.25 mm, a water content of less than about 20% by weight, a bulk density of from about 460 to about 775 kg/m³ corresponding to a densification factor of from 1.7 to 2.5 when oven-dried.

4. A process for agglomerating volatilized silica in the form of fine sand-like grains, which consists essentially of mixing volatilized silica fumes with 10 to 35% by weight of a supersaturated solution of an alkaline earth metal oxide and recovering sand-like grains of volatilized silica having a particle size of from about 80 micrometers to about 1.25 mm, a water content of less than about 20% by weight, a bulk density of from about 460 to about 775 kg/m³ corresponding to a densification factor of from 1.7 to 2.5 when oven-dried.

5. The process of claim 4, wherein the alkaline earth metal oxide is calcium oxide.

* * * * *